3,520,809
STABILIZATION OF ORGANIC SUBSTANCES
Allen K. Sparks, Des Plaines, Ill., assignor to Universal
 Oil Products Company, Des Plaines, Ill., a corporation
 of Delaware
No Drawing. Filed July 3, 1967, Ser. No. 650,586
Int. Cl. C10m *1/20, 3/14;* B01l *1/16*
U.S. Cl. 252—52
10 Claims

ABSTRACT OF THE DISCLOSURE

Stabilization of organic substances against oxidative deterioration and ultraviolet light absorption by incorporating in the organic substance a minor but stabilizing concentration of a compound of the following formula

where R is a polynuclear radical of four or more condensed aromatic rings and R' is hydrocarbyl or substituted hydrocarbyl, as exemplified by benzoylpyrene.

Description of the invention

This invention relates to the stabilization of organic substances and more particularly to a novel method of preventing deterioration of the organic substance during storage, transportation and/or use. In most organic substances the deterioration is due primarily to oxidation reactions. In other organic substances as, for example, plastics, deterioration also is caused by U.V. light absorption. Regardless of the source thereof, deterioration of the organic substance is retarded and/or prevented by the novel method of the present invention.

Stabilization of the organic substances is accomplished in accordance with the present invention by incorporating therein a particular additive. In one embodiment, the organic substance is a plastic and particularly polyolefins, including polyethylene, polypropylene, polybutylene, mixed ethylene-propylene polymers, mixed ethylene-butylene polymers, mixed ethylene-propylene-butylene polymers, etc. The solid olefin polymers are used in many applications including electrical insulation, lightweight outdoor furniture, awnings, fibers, etc. Another plastic is polystyrene, which is particularly useful in the manufacture of molded or machined articles. Still another class of plastics is vinyl resins which are derived from monomers such as vinyl chloride, vinyl acetate, vinylidine chloride, etc., such plastics including polyvinyl chloride, copolymers of vinyl chloride with acrylonitrile, methacrylonitrile, vinylidine chloride, alkyl acrylates, alkyl methacrylates, alkyl maleates, alkyl fumarates, polyvinyl butyral, etc., or mixtures thereof. Still other plastics include polycarbonates, phenol-formaldehyde resins, urea-formaldehyde resins, melamine-formaldehyde resins, acryloid plastics, polyacetals, linear or cross-linked polyesters, etc. Still other plastics are in the textile class and include nylon (polyamide), Perlon L or 6-nylon (polyamide), Dacron (terphthalic acid and ethylene glycol), Orlon (polyacrylonitrile), Dynel (copolymer of acrylonitrile and vinyl chloride), Acrilan (polyacrylonitrile modified with vinyl acetate), Saran (copolymer of vinylidine chloride and vinyl chloride), Rayon, etc.

As hereinbefore set forth, deterioration of the plastics occurs due to oxidation and/or U.V. absorption. In many uses, the plastics are exposed to sunlight and air for extended periods of time and undergo deterioration during such exposure.

Another organic substance which undergoes deterioration due to oxidation is rubber, which may be synthetically prepared or naturally occurring. Synthetic rubbers include SBR rubber (copolymer of butadiene and styrene), Buna N (copolymer of butadiene and acrylonitrile), butyl rubber (copolymer of butadiene and isobutylene), Neoprene rubber (chloroprene polymer), Thiokol rubber (polysulfide), silicone rubber, etc. The natural rubbers include hevea rubber, cautchouc, balata, gutta percha, etc.

Still other organic substances which undergo deterioration due to oxidation include hydrocarbon distillates. Illustrative hydrocarbon distillates include gasoline, naphtha, kerosene, jet fuel, solvents, fuel oil, burner oil, range oil, diesel oil, marine oil, turbine oil, cutting oil, rolling oil, soluble oil, drawing oil, slushing oil, lubricating oil, fingerprint remover, wax, fat, grease, etc. Still other organic substances include synthetic oils, as, for example, synthetic lubricating oils, which comprise one or a mixture of aliphatic esters, polyalkylene oxides, silicones, esters of phosphoric and silicic acids, highly fluorine-substituted hydrocarbons, etc. Of the aliphatic esters, di-(2-ethylhexyl) sebacate is being used on a comparatively large commercial scale. Other aliphatic esters include dialkyl azelates, dialkyl suberates, dialkyl pimelates, dialkyl adipates, dialkyl glutarates, etc. Specific examples of these esters include dihexyl azelate, di-(2-ethylhexyl) azelate, di-3,5,5-trimethylhexyl glutarate, di-3,5,5-trimethylpentyl glutarate, di-(2-ethylhexyl) pimelate, di-(2-ethylhexyl) adipate, triamyl tricarballylate, pentaerythritol tetracaproate, dipropylene glycol dipelargonate, 1,5-pentane-diol-di-(2-ethylhexanonate), etc. The polyalkylene oxides and derivatives include polyisopropylene oxide, polyisopropylene oxide diether, polyisopropylene oxide diester, etc. The silicones include methyl silicones, methyl phenyl silicones, etc., and the silicates include, for example, tetraisooctyl silicate, diphenyl di-n-dodecyl silane, octadecyl tri-n-decyl silane, polysilylmethylenes, various silane mixtures, silicone-ester blends, etc. The highly fluorinated hydrocarbons include fluorinated oil, perfluorohydrocarbons, etc.

Additional synthetic lubricating oils include (1) neopentyl glycol esters in which the ester group contains from three to twelve carbon atoms or more, and particularly neopentyl glycol propionates, neopentyl glycol butyrates, neopentyl glycol caproates, neopentyl glycol caprylates, neopentyl glycol pelargonates, etc., (2) trimethylol alkanes, such as trimethylol ethane, trimethylol propane, trimethylol butane, trimethylol pentane, trimethylol hexane, trimethylol heptane, trimethylol octane, trimethylol decane, trimethylol undecane, trimethylol dodecane, etc., as well as the esters thereof and particularly triesters in which the ester portions each contain from three to twelve carbon atoms and may be selected from those hereinbefore specifically set forth in connection with the discussion of the neopentyl glycol esters, and (3) tricresylphosphate, trioctylphosphate, trinonylphosphate, tridecylphosphate, as well as mixed aryl and alkyl phosphates, etc.

In one method greases are prepared by compositing metallic soaps with lubricating oils, which oils may be of petroleum origin or synthetically prepared, and are classified as lithium base grease, sodium base grease, strontium base grease, aluminum base grease, barium complex grease, calcium complex grease, sodium-calcium grease, calcium-lead grease, etc. The grease also may contain thickening agents such as silica, carbon black, talc, organic modified Bentonite, etc., polyacrylates, amides, polyamides, aluminum imides, phthalocyanines, oxanilides, complex aromatic imides and amides, hydantoin derivatives, benzidine dyes, aryl ureas, methyl N-n-octadecyl terephthalamate, etc. Another type of grease is prepared from oxidized petroleum wax, to which the saponifiable base is combined with the proper amount of the desired saponifying agent, and the resultant mixture processed to produce a grease. Other types of greases in which the features of the present invention are usable include petroleum grease, whale grease, wool grease, etc., and those made from inedible fats, tallow, butcher's waste, etc.

The above are illustrative examples of organic substances which undergo deterioration due to oxygen, U.V. absorption, etc. It is understood that the novel process of the present invention also may be used with other organic substances which undergo such deterioration.

In one embodiment the present invention relates to a method of stabilizing an organic substance against deterioration which comprises incorporating therein a stabilizing concentration of an inhibitor of the following general formula:

where R is a polynuclear radical of four or more condensed aromatic rings and R' is hydrocarbyl or substituted hydrocarbyl.

In a specific embodiment, the present invention relates to a method of stabilizing polyolefin against U.V. absorption which comprises incorporating therein a stabilizing concentration of benzoylpyrene.

In another specific embodiment, the present invention relates to a method of stabilizing a polyolefin which comprises incorporating therein a stabilizing concentration of octanoylpyrene.

In still another embodiment the present invention relates to an organic substance normally subject to deterioration due to oxidation and/or U.V. absorption containing a stabilizing concentration of an inhibitor as set forth herein.

The novel inhibitor of the invention is illustrated by the formula:

where R is a polynuclear radical of 4 or more condensed aromatic rings and R' is hydrocarbyl or substituted hydrocarbyl.

In a preferred embodiment, R in the above formula is pyrenyl. Other four condensed aromatic ring radicals are derived from chrysene, triphenylene, naphthacene, benzanthracene, etc. Five condensed aromatic ring radicals are derived from perylene, pentacene, dibenzanthracene, etc. Six condensed aromatic ring radicals are derived from hexacene, dibenzochrysene, anthanthrene, etc. In still another embodiment the condensed aromatic ring radical may be a heterocyclic radical. In one embodiment the heterocyclic radical will contain nitrogen and may be derived from compounds as benzophenanthroline, pyridophenanthridine, naphthoquinoline, naphthisoquinoline, benzacridine, benzophenanthridine, etc. In another embodiment, the heterocyclic ring structure may contain other elements in the nucleus as, for example, a heterocyclic structure containing both nitrogen and boron.

It is an essential feature of the present invention that the polynuclear radical contains at least four condensed aromatic rings. Compounds having this configuration appear to be of improved potency for use as an additive.

As hereinbefore set forth, R' in the above formula is hydrocarbyl including aryl, alkyl and cycloalkyl, or substituted hydrocarbyl. In a preferred embodiment R' is an aryl and particularly phenyl. Thus, a preferred inhibitor in this embodiment is benzoylpyrene. Other aryl radicals include naphthyl, anthracyl, pyrenyl, and other condensed aromatic rings including those specifically hereinbefore set forth. When R' is substituted hydrocarbyl, it is understood that one or more of the aryl nuclei may contain one or more hydrocarbyl substituents or substituents containing oxygen, nitrogen, sulfur or halogen. When the substituent is hydrocarbyl, it may be selected from alkyl, aryl, aralkyl, alkaryl, cycloalkyl, etc. When the substituent contains oxygen, a preferred inhibitor comprises 2-carboxy-benzoylpyrene.

In another embodiment R' is alkyl and may contain from 1 to 40 and preferably from 4 to 20 carbon atoms. A preferred inhibitor in this embodiment is octanoylpyrene. Here again, it is understood that the alkyl group may be substituted with hydrocarbyl or nonhydrocarbyl substituents, preferably being selected from those hereinbefore specifically set forth.

The compounds for use as inhibitors are prepared in any suitable manner. In a preferred embodiment these are prepared by the reaction of the condensed aromatic ring compound as, for example, pyrene, with aroyl or alkoyl chloride in the presence of aluminum chloride and preferably in the presence of a suitable solvent including carbon disulfide, nitrobenzene, chlorobenzene, etc. The reaction preferably is effected at a temperature below about 20° C., although a higher temperature which generally will not exceed about 50° C. may be used in some preparations. Preferably the pyrene or other condensed aromatic ring compound and acid chloride are used in equal mole proportions, although these mole proportions may range from 0.5 to 2 mole proportions of one reactant per one mole proportion of the other reactant. In one method the reaction is effected by first forming a solution of pyrene, for example, in the solvent, then adding the aluminum chloride and thereafter gradually adding the acid chloride. The mixture then is stirred and, if necessary, cooled and maintained at the desired temperature. Following completion of the reaction, the solvent may be removed by steam distillation or otherwise and the solid product is recovered and preferably purified by recrystallization from a suitable solvent, including benzene, toluene, hexane, heptane, alcohol, or mixture thereof.

The product generally will be recovered as a solid and may be utilized as such or dissolved in a suitable solvent. Any suitable solvent may be used and will be one which will be satisfactory for use in the organic substance to be stabilized. Thus, for example, when the organic substance is a hydrocarbon, the solvent may comprise an aromatic hydrocarbon including benzene, toluene, xylene, cumene, etc., or mixture thereof.

The additive of the present invention is incorporated in the organic substance in a concentration sufficient to effect the desired stabilization. The specific concentration will depend upon the particular organic substance being stabilized and thus the concentration may be within the range of from about 0.001% to about 25% by weight of the organic substance. In most cases, however, the concentration will be within the range of from about 0.01% to about 5% by weight of the organic substance.

In many applications it may be advantageous to utilize the additive of the present invention in conjunction with other additives. For example, in the stabilization of plastics, a phenolic antioxidant, particularly 2,6-di-tert-butyl-4-methyl phenol or 2,4-dimethyl-6-tertiary-butyl phenol may be used. Other phenolic inhibitors or amino type inhibitors also may be used. When used in rubber, it also is desirable to incorporate an antiozonant in the rubber, preferred antiozonants being N,N'-di-sec-octyl-p-phenylenediamine, N-phenyl-N'-isopropyl-p-phenylenediamine, N-phenyl-N'-sec-octyl-p-phenylenediamine, etc.

The additive of the present invention is incorporated in the organic substance in any suitable manner and when desired, may be admixed with the other additives and the mixture added to the organic substance in one step. When the additive or mixture is to be incorporated into a plastic, resin or the like, it may be added to the hot melt, with stirring, generally in a Banbury mixer, extruder or other device. Incorporation of the additive in a liquid preferably is accompanied by intimate mixing to effect distribution of the additive throughout the liquid. When the additive is added to a multicomponent mixture as, for example, grease, it may be added to one of the components and, in this manner, incorporated into the final mixture or it may be added directly into the final mix.

The following examples are introduced to illustrate further the novelty and utility of the present invention but not with the intention of unduly limiting the same.

EXAMPLE I

The inhibitor of this example is benzoylpyrene and was prepared by first forming a solution of 30.3 g. (0.15 mole) of pyrene in 225 cc. of carbon disulfide. Then 23 g. of aluminum chloride was added to the solution, after which 21.1 g. (0.15 mole) of benzoyl chloride was added dropwise over a period of 30 minutes. Stirring of the mixture was continued for three hours and then 200 gm. of ice and 20 cc. of 12 N hydrochloric acid were added to the mixture. The color changed gradually from black to yellow-orange. The mixture then was steam distilled to remove the carbon disulfide, after which the residue gradually crystallized. The residue was recrystallized from benzene. The benzoylpyrene was recovered in a yield of 25.7 g.

*Analysis.*—Carbon: found 89.3% Calculated 90.1% Hydrogen: found 4.6% Calculated 4.6% Oxygen: found 6.04% Calculated 5.3%.

EXAMPLE II

The inhibitor of this example is 2-carboxy benzoylpyrene and was prepared by charging 50.5 g. (0.25 mole) of pyrene, 40 g. of aluminum chloride and 200 cc. of chlorobenzene into a 1-liter 3-neck flask fitted with reflux condenser, stirrer and dropping funnel. The mixture was stirred rapidly and a solution of 37 g. (0.25 mole) of phthalic anhydride in 300 cc. of chlorobenzene was added during a period of one hour at a temperature of 25–40° C. Stirring was continued for an additional 2 hours, after which the mixture was quenched with ice and then steam distilled to remove the chlorobenzene solvent. The residue was filtered and dried at 60° C. in vacuum. The product was recovered in a yield of 67 g. Recrystallization from benzene yielded yellow crystals having a melting point of 221–222° C.

EXAMPLE III

The inhibitor of this example is octanoylpyrene and was prepared as follows. A mixture of 52 g. of aluminum chloride and 33 g. (0.2 mole) of capryloyl chloride was formed and cooled to 10° C. Then 100 ml. of nitrobenzene was added. The temperature rose to about 50° C. and the mixture was cooled down to 0° C., at which time 40 g. (0.2 mole) of pyrene was added in small portions with continuous stirring. The temperature was maintained at 5–10° C. with an ice-salt bath. Stirring was continued for 6 hours at 0° C. and an additional 6 hours at room temperature. The mixture then was poured into ice-HCl with vigorous stirring. Benzene then was added, the mixture filtered, the solid washed in hot benzene-alcohol and steam distilled to remove the nitrobenzene solvent. The product was recrystallized from alcohol and was recovered in a yield of 16 g. as a light yellow solid having a melting point of 75–77° C.

EXAMPLE IV

As hereinbefore set forth, the compounds of the present invention are particularly useful as additives in polyolefins to prevent deterioration due to oxygen and/or U.V. absorption. The present example reports evaluations made in a solid polypropylene. The solid polypropylene without inhibitor was stated to have properties substantially as follows:

TABLE I

| | |
|---|---|
| Specific gravity | 0.910–0.920. |
| Refractive index, $n_D^{25}$ | 1.510. |
| Heat distortion temperature: | |
|   At 66 p.s.i. load | 116° C. |
|   At 264 p.s.i. load | 66° C. |
| Tensile yield strength, p.s.i. (ASTM D–638–58T) (0.2″ per min.) | 4700. |
| Total elongation, percent | 300–400. |
| Stiffness flexural (ASTM D747–50) $10^5$ p.s.i. | 1.8. |
| Shore hardness (ASTM D676–55T) | 74D. |

Samples of the polypropylene, with and without additive, were pressed into sheets, and dumbell specimens were cut from the sheets. The dumbell specimens were mounted on boards and exposed to carbon arc rays at about 52° C. in a Fade-Ometer. The specimens were withdrawns periodically, removed from the board and the yield strength determined in an Instron Universal tester. In the Instron Universal tester the specimen is gripped firmly at the top and bottom. A constant pull of 2 inches per minute is exerted downwardly and the point at which the sample loses its resistance to permanent deformation is defined as the yield strength. In most cases, the yield strength is equivalent to the tensile strength which is the pounds per square inch force at which rupture occurs.

The control sample of the polypropylene not containing the additive had an initial yield strength of 4600 p.s.i. which dropped to 480 p.s.i. after exposure for 96 hours in the Fade-Ometer.

In contrast, a sample of the polypropylene containing 0.5% by weight of benzoylpyrene, prepared as described in Example I, still had a yield strength of 3480 p.s.i. after 264 hours of exposure in the Fade-Ometer. The specimens containing this inhibitor were exhausted at this time and, accordingly, the evaluation was terminated.

EXAMPLE V

Another series of evaluations were made in the same manner as described in Example IV with additional samples of the same polypropylene, but the inhibitor of this example was 2-carboxy benzylpyrene prepared as described in Example II. This inhibitor similarly was used in a concentration of 0.5% by weight.

When evaluated in the same manner as described in Example IV, the polypropylene had a yield strength of 3430 p.s.i. after 288 hours of exposure in the Fade-Ometer. This is compared to a yield strength of 480 p.s.i. after 96 hours of exposure for the control sample.

EXAMPLE VI

In another series of evaluations made in the same manner as described in Example IV, the inhibitor used in this example was actanoylpyrene prepared as described in Example III. Similarly, the inhibitor was used in a concentration of 0.5% by weight. After 288 hours of exposure in the Fade-Ometer, the polypropylene had a yield strength of 3390 p.s.i.

EXAMPLE VII

Benzoylpyrene, prepared as described in Example I, also was evaluated as an oxidation inhibitor in polypropylene by a different method. This method is similar to that described by Hawkins, Hansen, Matreyek and Winslow in Rubber Chemistry and Technology, October-November 1959, pages 1164–1170, except that an electrically heated aluminum block rather than an oven was used to maintain the desired temperature. The oxygen absorption of the sample was determined manometrically rather than volumetrically. In this method samples of the polypropylene, weighing about 0.5 gram each, are placed in separate 8 m. glass tubes and the tubes then are inserted into horizontal rows of openings located concentrically around the heater. The temperature is maintained at about 140° C. The glass tubing also is packed with glass wool and molecular sieves to absorb the gases. Each of the glass tubes is connected to an individual manometer containing mercury, and the differential pressure is periodically determined. The Induction Period is taken as the number of hours required to reach a pressure differential of 20 cm. Hg.

When evaluated in the above manner, a control sample of the polypropylene without additive had an Induction Period of about 4 hours. In contrast, a sample of the polypropylene containing 0.5% by weight of benzoylpyrene had an Induction Period of 2240 hours. This considerable increase in the stability of the polypropylene against oxidation further demonstrates the unusual effectiveness of this inhibitor.

EXAMPLE VIII

The plastic of this example is solid polyethylene of the high density type. An inhibited product of this polyethylene is marketed commercially under the trade name of "Fortiflex." A batch of this polyethylene free of inhibitor is pressed into sheets of about 17 mil. thickness and cut into plaques of about 1⅜" x 1½". When employed, the additive is incorporated in the polyethylene prior to pressing into sheets. The different samples are evaluated in the Fade-Ometer. The plaques are inserted into plastic holders, affixed onto a rotating drum and exposed to carbon arc rays at about 52° C. in the Fade-Ometer. The samples are examined periodically by infrared analysis to determine the carbonyl band at 1715 cm. —1 which is reported as the "carbonyl number." The higher intensity of the carbonyl band indicates a higher carbonyl concentration (expressed as carbonyl number) and accordingly increased deterioration.

A sample of the polyethylene without inhibitor when evaluated in the Fade-Ometer increases from a carbonyl number of 28 to a carbonyl number of 855 within 624 hours. In contrast, another sample of the polyethylene containing 1% by weight of benzoylpyrene, prepared as described in Example I, does not develop a carbonyl number of 1000 for a considerably longer period of time.

EXAMPLE IX

The inhibitor of this example is octanoylpyrene, prepared as described in Example III, and is utilized as an inhibitor in polyvinyl chloride plastic. Here again, the additive is incorporated by partly melting the polyvinyl chloride plastic and adding the inhibitor into the hot melt in a concentration of 0.75% by weight. This serves to inhibit deterioration of the polyvinyl chloride plastic due to U.V. light absorption.

EXAMPLE X

Benzoylpyrene, prepared as described in Example I, is used as inhibitor in polystyrene. The inhibitor is incorporated in a concentration of 1% by weight by partly melting the polystyrene and adding the inhibitor to the hot melt. The polystyrene containing the inhibitor is of improved resistance to deterioration by oxidation and ultraviolet light.

EXAMPLE XI

Stearoyl triphenylene is prepared by the general method hereinbefore set forth, and is used as an additive in grease. The additive is incorporated in a concentration of 0.3% by weight in a commercial Mid-Continent lubricating oil having an S.A.E. viscosity of 20. Approximately 92% of the lubricating oil then is mixed with approximately 8% by weight of lithium stearate. The mixture is heated to about 230° C., with constant agitation. Subsequently the grease is cooled, while agitating, to approximately 120° C., and then the grease is further cooled slowly to room temperature.

The stability of the grease is tested in accordance with ASTM D-942 method, in which method a sample of the grease is placed in a bomb and maintained at a temperature of 121° C. Oxygen is charged to the bomb, and the time required for a drop of five pounds pressure is taken as the Induction Period. A sample of the grease without additive will reach the Induction Period within 4 hours. A sample of the grease containing 0.3% by weight of stearoyl triphenylene will not reach the Induction Period until more than 100 hours, when evaluated in the above manner.

EXAMPLE XII

Benzoylpyrene, prepared as described in Example I, is utilized as an additive in synthetic lubricating oil. The synthetic lubricating oil is dioctyl sebacate and is marketed under the trade name of "Plexol." The additive is incorporated in a concentration of 1% by weight in the synthetic lubricating oil with intimate mixing. This serves to prevent oxidative deterioration of the lubricating oil.

EXAMPLE XIII

Benzoylpyrene, prepared as described in Example I, is used as an additive in fuel oil. The additive is incorporated in a concentration of 0.5% by weight in the fuel oil and serves to retard deterioration thereof due to oxidation reactions.

I claim as my invention:

1. An organic substance normally subject to deterioration due to oxidation and/or ultraviolet absorption containing, as an inhibitor against said deterioration, a stabilizing concentration of an inhibitor of the following formula

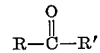

where R is a polynuclear radical of four or more condensed aromatic rings, said rings being hydrocarbon aromatic rings or heterocyclic nitrogen-containing rings, and R' is hydrocarbyl or carboxy-substituted hydrocarbyl.

2. The composition of claim 1 in which the organic substrate is lubricating oil.

3. The composition of claim 1 in which said inhibitor is aroylpyrene.

4. The composition of claim 3 in which said inhibitor is benzoylpyrene.

5. The composition of claim 1 in which said inhibitor is alkanoylpyrene.

6. The composition of claim 5 in which said inhibitor is octanolypyrene.

7. The composition of claim 1 wherein said organic substance is an organic resinous polymer.

8. The composition of claim 7 wherein said polymer is a solid polymer of one or more aliphatic monoolefins containing from 2 to 4 carbon atoms each.

9. The composition of claim 7 wherein said polymer is polystyrene.

10. The composition of claim 7 wherein said polymer is polyvinyl chloride.

References Cited

UNITED STATES PATENTS

| | | | |
|---|---|---|---|
| 2,165,261 | 7/1939 | Hewlett et al. | 252—52 |
| 2,221,380 | 11/1940 | Horsch | 252—52 |
| 3,389,004 | 6/1968 | Dressler et al. | |
| 3,403,967 | 10/1968 | Stanley | 252—52 X |

DANIEL E. WYMAN, Primary Examiner

J. M. HICKEY, Assistant Examiner

U.S. Cl. X.R.

252—407, 300; 260—45.7, 45.8, 403, 814